(12) United States Patent
Froggatt et al.

(10) Patent No.: US 7,515,276 B2
(45) Date of Patent: Apr. 7, 2009

(54) HIGH RESOLUTION INTERFEROMETRIC OPTICAL FREQUENCY DOMAIN REFLECTOMETRY (OFDR) BEYOND THE LASER COHERENCE LENGTH

(75) Inventors: Mark Froggatt, Blacksburg, VA (US); Ryan J. Seeley, Christiansburg, VA (US); Dawn K. Gifford, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 0 days.

(21) Appl. No.: 11/779,527

(22) Filed: Jul. 18, 2007

(65) Prior Publication Data
US 2008/0024785 A1    Jan. 31, 2008

Related U.S. Application Data

(60) Provisional application No. 60/833,267, filed on Jul. 26, 2006.

(51) Int. Cl.
*G01B 9/02*    (2006.01)
(52) U.S. Cl. .................................. 356/497; 356/73.1
(58) Field of Classification Search ............... 356/73.1, 356/479, 497
See application file for complete search history.

(56) References Cited

U.S. PATENT DOCUMENTS

| | | | |
|---|---|---|---|
| 4,241,308 A | 12/1980 | Cellier et al. ................. 328/55 |
| 5,291,267 A * | 3/1994 | Sorin et al. ................. 356/479 |
| 5,798,521 A | 8/1998 | Froggatt ................. 250/227.19 |
| 6,426,496 B1 | 7/2002 | Froggatt et al. ........ 250/227.18 |
| 6,813,027 B2 | 11/2004 | Szafraniec et al. |
| 2002/0154316 A1* | 10/2002 | Davidson et al. ............. 356/477 |
| 2003/0107743 A1* | 6/2003 | Van Wiggeren ............. 356/477 |
| 2006/0119857 A1* | 6/2006 | Steffens et al. .............. 356/477 |

OTHER PUBLICATIONS

International Search Report and Written Opinion of the International Searching Authority mailed Mar. 27, 2008 in corresponding PCT Application PCT/US07/16230.
International Preliminary Report on Patentability mailed Jan. 27, 2009, in corresponding International Application No. PCT/US2007/016230.
Written Opinion of the International Searching Authority mailed Mar. 27, 2008 in corresponding International Application No. PCT/US2007/016230.

\* cited by examiner

*Primary Examiner*—Hwa S Lee (Andrew)
(74) *Attorney, Agent, or Firm*—Nixon & Vanderhye P.C.

(57) ABSTRACT

The technology described here enables the use of an inexpensive laser to measure an interferometric response of an optical device under test (DUT) at reflection lengths significantly greater than the coherence length of the laser. This is particularly beneficial in practical interferometric applications where cost is a concern. In other words, inexpensive lasers having shorter coherence lengths may be used to achieve very high interferometric measurements at longer DUT reflection lengths. The technology also enables the use of such inexpensive lasers to measure Rayleigh scatter in commercial-grade, single-mode optical fiber.

30 Claims, 8 Drawing Sheets

HIGH RESOLUTION INTERFEROMETRIC OPTICAL FREQUENCY DOMAIN REFLECTOMETRY (OFDR) BEYOND THE LASER COHERENCE LENGTH

RELATED APPLICATION

This application claims the priority and benefit of U.S. Provisional patent application 60/833,267, filed Jul. 26, 2006, which is incorporated herein by reference in its entirety.

TECHNICAL FIELD

The technical field relates to measurement equipment and techniques, and more particularly, to improving the accuracy, precision, and application of interferometric measurements, such as those based on Optical Frequency Domain Reflectometry (OFDR), using inexpensive lasers having a relatively short coherence length/wide linewidth.

BACKGROUND

Mixing between a reference signal and a data signal is often necessary to extract information about an optical device or network. A probe or measurement signal and a reference signal originating from the same source typically mix or interfere, resulting in optical interference "fringes." A positive fringe occurs when the light is in phase and constructively combines (interferes) to a greater intensity, and a negative fringe occurs when the light is 180 degrees out of phase and destructively combines (interferes) to cancel out the light. The fringe intensities can be detected and used to assess information about the device being probed. In interferometric sensing, a reference signal is mixed with a reflected probe signal whose phase and/or amplitude is modified by a parameter to be measured. The mixing produces an interference signal, and the amplitude of the interference signal depends on how efficiently the two optical signals mix.

Optical Frequency Domain Reflectometry (OFDR) has been used for many years to measure the time-response of optical systems. Most optical time-domain reflectometry systems are simple pulse-echo type systems where a source emits a short pulse that propagates down the fiber and scatters off of discontinuities. This scattered light returns back as echoes that are detected as a function of time. The intensity of the detected light is then plotted as a function of time, which can be converted to distance if the speed of light in the medium is known. OFDR may be used to provide data related to one or more optical characteristics (e.g., backscatter, dispersion, etc.) of a fiber or fiber optic device that is part of a fiber over relatively short fiber distances, e.g., less than several hundred meters, but with relatively high "spatial" resolutions, e.g., centimeters and less. High spatial resolution is valuable for many reasons. For example, it allows more precise location and/or determination of optical characteristic of "events" like fiber flaws, cracks, strains, temperature changes, etc. and devices like couplers, splitters, etc. High resolution also allows performing such operations with a level of precision that distinguishes between events or devices located close together. Without that high resolution, measurements for closely located events or devices cannot be made on an individual event or device level.

OFDR sweeps a laser through a continuum of frequencies and records the interference fringes as a function of the laser frequency. These fringes are then Fourier transformed to produce time-domain information. Because interference is involved, it is widely believed that the range of the OFDR measurement is restricted by the coherence length of the laser used as the source. The coherence length of a laser is the distance along the optical fiber where the light maintains a specified degree of coherence. Coherence is the attribute a wave whose relative phase is predictable during a resolving time T. If the wave is separated into two paths and then brought back together after some time, T, the waves will interfere and produce predictable fringes if T is less that the coherence time of the source, and random unpredictable fringes if T is greater than the coherence time of the source. This decrease in predictability is gradual as the delay difference passes through T, but once the random part of the phase exceeds 180 degrees, no real correlation will be discernable. OFDR is based on an assumption that the optical device being measured is within the coherence length of the laser used.

The coherence length (usually measured in units of nanoseconds of optical delay) is roughly equal to the inverse of the laser linewidth, i.e., the amount of frequency spectrum that the laser light occupies across its center frequency. OFDR instruments are commercially available which use an external cavity, narrow-linewidth tunable laser (e.g., 100 KHz) to obtain resolutions on the order of tens of microns over 10 s to 100 s of meters of length. External cavity, narrow-linewidth tunable lasers have long coherence lengths. Unfortunately, external cavity tunable lasers are very expensive. In general, high resolution is harder to achieve over longer fiber distances, and this is especially true for inexpensive lasers that typically have shorter coherence lengths.

Distributed feed-back (DEB) lasers are inexpensive when compared with narrow-linewidth tunable lasers but have wider linewidths, and thus, short coherence lengths. They are also rugged and readily available in a range of wavelengths and packages. Lasers currently used in CD and DVD players are even cheaper and have linewidth characteristics similar to the DFB lasers. Although the CD lasers are not commonly fiber-coupled (a disadvantage), they generate light that can be detected by silicon detectors which are much less expensive than InGaAs (Indium Gallium Arsenide) detectors. It would be desirable to be able to use such inexpensive lasers and detectors to achieve spatial resolutions on the order of 1 mm over longer fiber distances, e.g., hundreds or thousands of meters. Technology with this capability would be valuable and applicable to a wide range of applications.

While DFB and CD type lasers are inexpensive and readily available, they have relatively wide linewidths, e.g., on the order of 10 MHz, compared to external cavity, narrow-linewidth tunable lasers. Because of this, it has been assumed that they could only be used to perform OFDR-type measurements over ranges of less than 100 ns in delay, or less than a 10 meter length in reflection over an optical fiber. If the coherence time of a laser is 100 ns, then after about 100 nanoseconds the phase of the laser light propagating along the fiber, (based upon an initial measurement of the phase), changes and can not be predicted with any certainty. It is this random nature of the phase beyond the 100 ns time period, i.e., beyond the coherence length of this particular type of laser, that led to an assumption that such a laser cannot be used for interferometry when interferometer paths differ by more than 100 ns, i.e., when the length of the reflection path exceeds 10 meters. Since many OFDR applications require ranges greater than 100 nm (corresponding to a coherence time delay longer than 1000 ns), the casual observer naturally assumes that these lasers could not be used in these applications. The inventors discovered that this assumption was wrong.

SUMMARY

The technology described here enables the use of an inexpensive laser to measure an interferometric response of an optical device under test (DUT) at reflection lengths significantly greater than the coherence length of the laser. This is particularly beneficial in practical interferometric applications where cost is a concern. In other words, inexpensive lasers having shorter coherence lengths may be used to achieve very high resolution interferometric measurements at longer DUT reflection lengths. The technology also enables the use of such inexpensive lasers to measure Rayleigh scatter in commercial-grade, single-mode optical fiber.

The technology describes both a method and apparatus for interferometrically measuring an optical device under test (DUT). The optical device under test is scanned by varying a wavelength of light generated by a laser with the laser having a corresponding coherence length. The optical device under test has an associated optical length greater than the coherence length of the laser. An interferometric response of the optical device under test to the laser scanning is determined. The coherence length is a distance that the laser light can travel and still have a predictable phase. The interferometric response may be in the time domain or in the frequency domain.

An instantaneous or random phase of the laser may be predicted at an optical length associated with the optical device under test. The predicted laser phase is used in determining the interferometric response of the optical device under test. Using the predicted laser phase, an interferometric response is calculated for an optical length associated with the optical device under test and is used to compensate an instantaneous random phase variation of the laser at the optical length associated with the optical device under test. The interferometric intensity measured through the device under test is mixed with the predicted phase of the laser. This mixing operation is used in determining the interferometric response of the optical device under test.

In one non-limiting example, the interferometric response of the optical device under test may be determined with a resolution on the order of one centimeter or less at an optical length associated with the optical device under test over a range about that optical length. The laser may be a DFB laser, a single mode Fabry-Perot laser, or an external cavity DES laser (ECL). The optical length of the DUT may be on the order of one hundred meters or more. The optical length or the range of the optical device under test may be varied, the laser scanning and determination of the interferometric response of the optical device under test to the laser scanning are repeated.

In one non-limiting example embodiment, the interferometric intensity of the optical device under test is converted into digital format using data acquisition circuitry. A linewidth of the laser is less than a bandwidth of the data acquisition circuitry, and the linewidth is approximately inversely proportional to the coherence length of the laser. The laser interferometric intensity data is converted to laser phase data. The laser phase data is processed to generate location laser phase data at a location associated with the optical device under test. The location laser phase data is mixed, or multiplied, with the interferometric intensity data from the optical device under test. The mixed data is then transformed to generate the interferometric response of the optical device under test to the laser scanning.

Further non-limiting example implementation features include converting the laser phase data to second derivative laser phase data, processing the second derivative laser phase data to generate location second derivative laser phase data at a location associated with the optical device under test, and integrating the generated location second derivative laser phase data to provide location laser phase data. The correlated data may be low pass filtered and then linearized. The linearized data is then transformed to generate the interferometric response of the optical device under test to the laser scanning.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. For example, the description assumes an OFDR type system. But the principles and techniques described in an OFDR context may be used in other types of interferometric measurement systems such as Optical Vector Analyzers (OVAs) and distributed optical-fiber sensing systems. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

An optical network is described that uses a laser with short coherence length. But the optical network could also use a laser with a long coherence length. The instantaneous optical phase of that laser is measured while measuring an interferometric response of a device under test (DUT). The laser phase measurement is processed and used to compensate a DUT interferometric response. The processing results in high-resolution data for a specific DUT length (or delay) and range or segment about that length. The DUT segment can be varied so that the processing can be repeated to produce instantaneous phase compensated DUT interferometric data over the entire measurement range.

Figure 1:
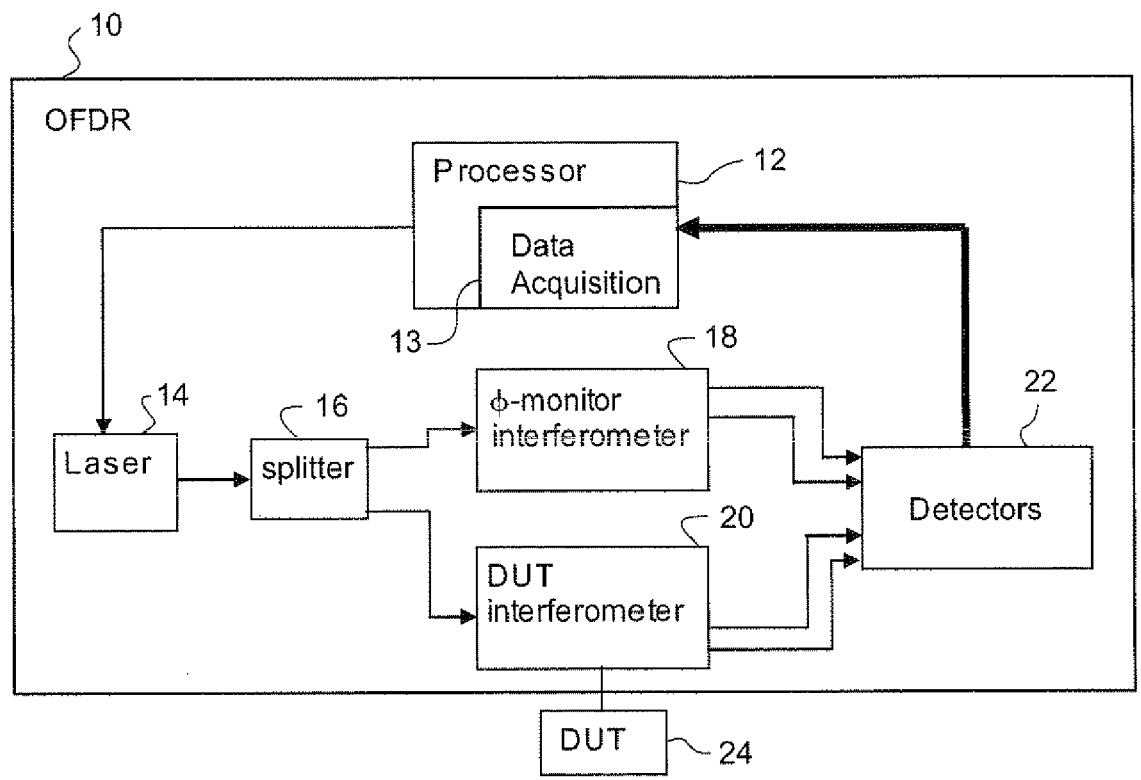
FIG. 1 is a function block diagram illustrating a non-limiting example OFDR.

FIG. 1 shows a function block diagram illustrating a non-limiting example of an Optical Frequency Domain Reflectometry (OFDR) system 10 that can make high resolution interferometric measurements beyond the laser's coherence length. The coherence length is a distance that the laser light can travel and still have a predictable phase. Any suitable laser type light source 14 may be used, but inexpensive lasers may be more attractive for commercial applications. Preferably, the laser 14 exhibits some degree of tunability, such as but not limited to a temperature-tuned or current-tuned DFB, and has a linewidth smaller than the bandwidth of the electronics in the data acquisition circuitry 16. For commercial applications, relatively inexpensive lasers like the DFB laser or a single mode Fabry-Perot laser similar to those used in consumer products like CD and DVD players may be desirable to use.

As one non-limiting example, the laser 14 may have a linewidth of 10 MHz and the data acquisition electronics 13 of the OFDR may have a bandwidth greater than 20 MHz. An optical splitter 16 splits the laser light into two paths where one portion of the light goes to a laser monitor (LM) interferometer 18 and the other portion of the light goes to a DUT interferometer 20. The laser monitor interferometer 18 produces optical signals that are detected by optical detectors 22 which convert the light into electrical format. The data acquisition circuitry 13 digitizes the analog electrical signals and provides the digital intensity information to a data processor 12 which predicts the instantaneous or random phase of the laser at a desired reflection length for the DUT (sometimes referred to as the DUT's optical length or delay) using the digitized intensity signals from the laser monitor interferometer 18. The data processor 12 compensates the DUT interferometer 20 output for a random phase variation of the laser at that DUT reflection length using the predicted laser phase.

Figure 2:
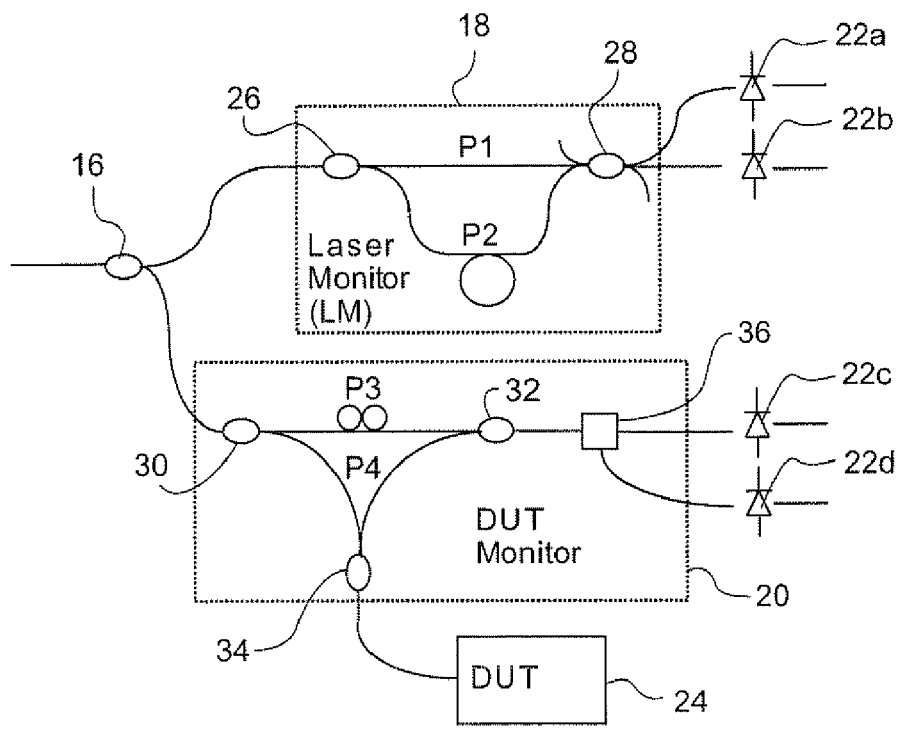
FIG. 2 is a function block diagram illustrating a non-limiting example of a laser monitor interferometer and a DUT monitor interferometer that may be used in FIG. 1.

FIG. 2 shows an example laser monitor (LM) interferometer 18 and an example DUT monitor interferometer 20. In the laser monitor (LM) interferometer 18, the light from splitter 16 is again split by a optical splitter 26 onto a first shorter reference fiber path P1 and a second longer measurement fiber path P2 before being combined in a 3×3 optical coupler 28 where the light from the two paths interferes. The 3×3 optical coupler 28 provides two out-of-phase, I and Q, measurements of the LM fringes detected on intensity detectors 22a and 22b which detect interference intensity signals. The light intensity detectors can be, for example, photodiodes. In the DUT monitor interferometer 20, the light is split again at an optical coupler 30 between a reference path P3 and a DUT path P4. Reflected light from the DUT 24 is coupled by an input/output coupler 34 and combined in (interferes with) coupler 32 with light from the reference path P3. Although the DUT is likely to be measured in reflection, it may also be measured in transmission. The interference output from coupler 32 is provided to a polarization beam splitter (PBS) 36 which provides two orthogonal polarized components of the light S1 and P1 to separate S and P light intensity detectors 22c and 22d. The light returned from the DUT is then recombined with the reference light to produce fringes that are detected and digitized.

Figure 3:
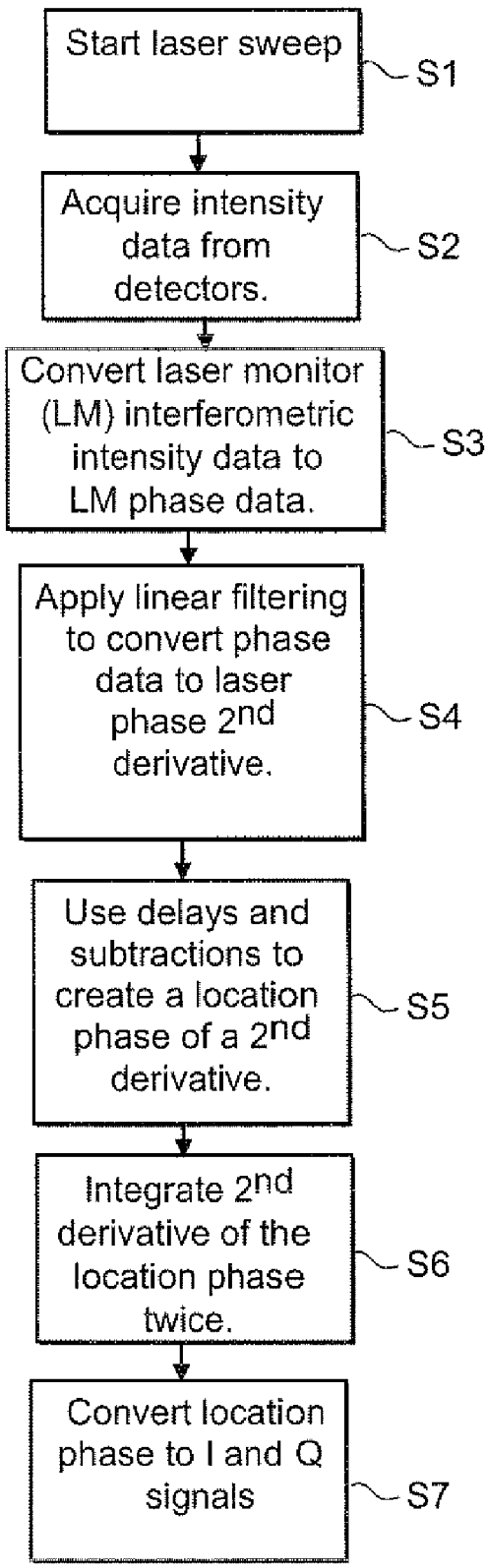
FIG. 3 is a flow chart illustrating non-limiting example data acquisition and processing procedures.
Figure 4:
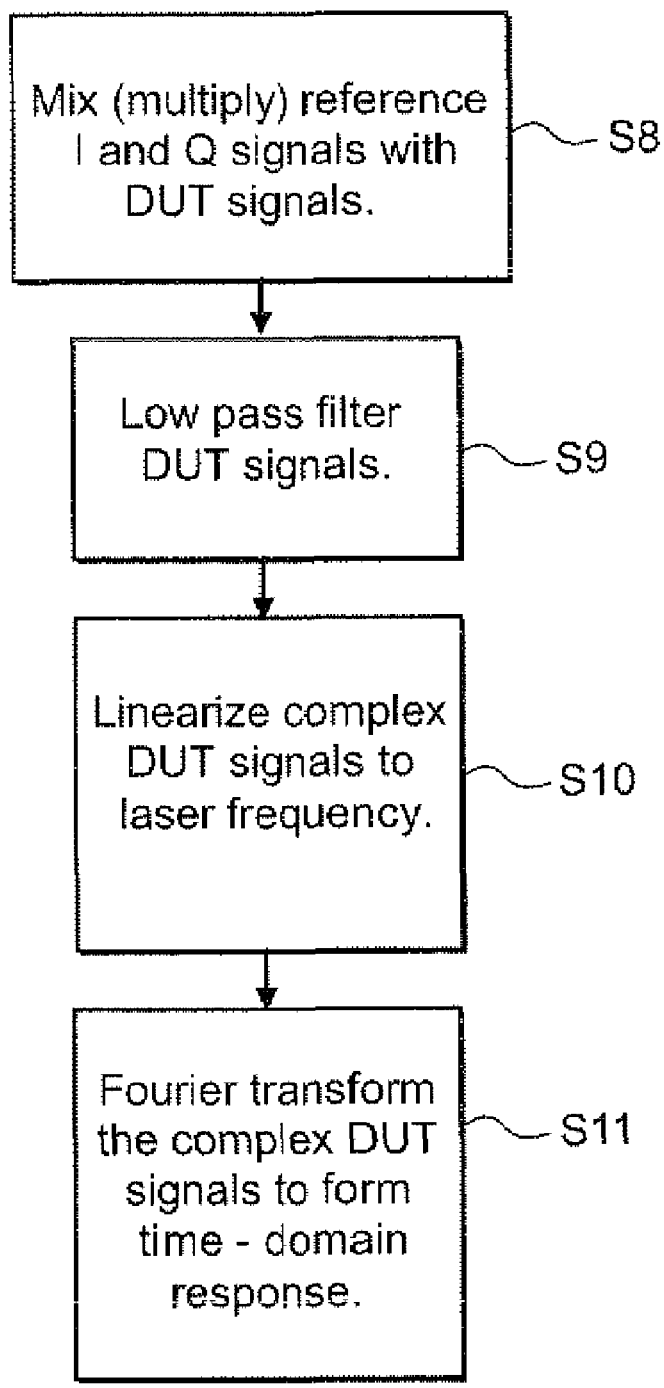
FIG. 4 is a flow chart illustrating additional non-limiting example data acquisition and processing procedures.

Procedures implemented in the data processor 12 compute the predicted instantaneous laser phase at a particular optical length of the DUT using the digitized laser monitor signals. The data processor 12 uses the laser phase information to compensate the digitized DUT interferometric signals to calculate with a high degree of resolution the DUT interferometric response as a function of optical delay or optical length. FIGS. 3 and 4 are flowchart diagrams that illustrate a non-limiting, example set of procedures that may be implemented by the data processor 12.

In FIG. 3, the laser 14 is swept over a relevant range of frequencies (step S1), and light interference intensity signals are acquired from the detectors 22 and digitized (step S2). The laser monitor (LM) interferometric intensity data is then converted to LM phase data (step S3), and preferably, linear-filtered to convert the LM phase data to data corresponding to the second derivative of the laser phase data (step S4). Although the LM phase data can be processed, all of the necessary information is contained in the second derivative of the laser phase, and this derivative can be represented by only a few bits. If the processing is implanted in an FPGA, limiting the number of bits of precision reduces the resource requirements (e.g., memory and logic). The phase measured by the DUT interferometer is the difference between the phase of the reference light, which took a short path, and the DUT light, which presumably took a long path. Therefore, if the random phase of the light is known, the phase of DUT interference may be calculated by subtracting a delayed version of the laser phase from itself. Delays and subtractions are used, then, to create the second derivative of a phase of the laser light at the desired DUT location, i.e., a "location phase" (step S5). Because integration is a linear operation, the subtraction may be performed before or after the integration. Performing the subtraction before the integration consumes far fewer resources than doing it afterward.

The second derivative of a location phase is integrated twice to obtain the location phase at the DUT location (step S6), which is then converted to in-phase (I) and quadrature (Q) reference signals for the laser phase at the DUT location (step S7). In FIG. 4, the in-phase (I) and quadrature (Q) reference signals for the laser phase at the DUT location are multiplied or mixed with the DUT interference signals detected by the DUT interferometer 20 (step S8), which compensates for the otherwise unknown and random phase of the laser light at the DUT location. The multiplication or mixing product is low-passed filtered to remove the data associated with locations far from the selected location (step S9). This removed data, being farther than a coherence length away from the selected location, will not have had its phase properly compensated for, and is therefore not useful. The low-pass filtered, mixed DUT signals are linearized to a laser frequency (step S10) by re-sampling the data based upon the slowly varying part of the laser frequency as measured by the laser monitor. An example of how such re-sampling may be performed is described in "Apparatus and Method for Measuring Strain in Brag Gratings," U.S. Pat. No. 5,798,521, the disclosure of which is incorporated by reference. It may be desirable to simply use the linearized DUT response in the frequency domain. Otherwise, the linearized DUT signals are Fourier transformed to generate a corresponding time domain DUT interferometric response signal (S11).

Calculating the Laser Monitor Phase

Figure 5:
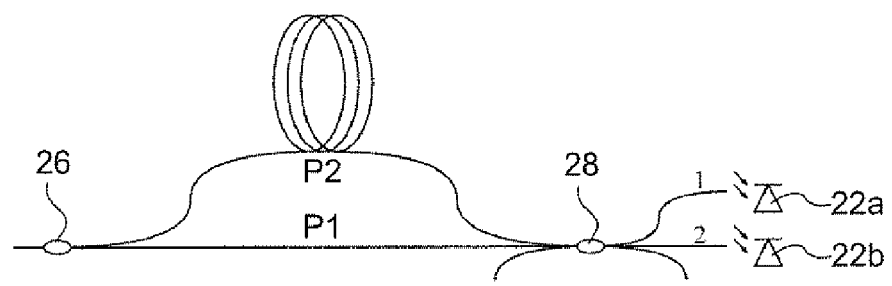
FIG. 5 is an example of a fiber-based quadrature laser phase monitor network.

Returning to FIG. 2, the laser monitor interferometer 18 provides two intensity signals (an in-phase signal and a quadrature signal which together form a quadrature intensity signal) that provide information about the laser phase. As indicated in step S3 of FIG. 3, the first step in processing the intensity data to find the DUT reflection at a particular delay or length along the fiber is to convert these two intensity signals to a signal representing the laser phase. Because the laser is not presumed to be monotonic, two out-of-phase signals are required to track both the magnitude and the direction of the laser phase change. In the network shown in FIG. 5, two out-of-phase signals are provided because of the nature of the 3×3 coupler 28 as described in "High precision wavelength monitor for tunable laser systems," Froggatt U.S. Pat. No. 6,426,496, incorporated here by reference.

An analysis of the laser monitor interferometer 18 begins with an expression for the laser light as a complex field with a time-dependent phase and amplitude:

$$E(t) = \rho(t) e^{i\phi(t)} \tag{1}$$

Here, $\rho(t)$ and $\phi(t)$ are the laser field amplitude and phase, respectively. The fields at the input of the 3×3 coupler 28 of the interferometer 18 are:

$$E_{T_1}(t) = \alpha_{T_1} \rho(t-T_1) e^{i\phi(t-T_1)}$$

$$E_{T_2}(t) = \alpha_{T_2} \rho(t-T_2) e^{i\phi(t-T_2)} \tag{2}$$

where $\alpha_{T_1}$ and $\alpha_{T_2}$ are the losses through each path of the interferometer 18, and $T_1$ and $T_2$ are the time-of-flight delays associated with paths 1 and 2 of the interferometer 18, respectively.

The recombined fields at two of the outputs of the 3×3 coupler 28 are given by:

$$E_{det1}(t) = E_{T_1}(t) + E_{T_2}(t)$$

$$E_{det2}(t) = E_{T_1}(t) + e^{i\phi_c} E_{T_2}(t) \tag{3}$$

where $\phi_c$ is the phase shift through the coupler. For a 3×3 coupler, $$\varphi_c \cong \frac{2\pi}{3}. \tag{4}$$

The intensity signal obtained by an optical detector is given by:

$$I_1(t) = |E_{det1}(t)|^2 = (E_{T_1}(t) + E_{T_2}(t))(E_{T_1}(t) + E_{T_2}(t))^* \; I_1(t) = $$
$$(\alpha_{T_1}\rho(t-T_1))^2 = (\alpha_{T_2}\rho(t-T_2))^2 + 2\alpha_{T_1}\alpha_{T_2}\beta(t-T_1)\rho$$
$$(t-T_2)\cos(\phi(t-T_1) - \phi(t-T_2)) \tag{5}$$

$$I_2(t) = (\alpha_{T_1}\rho(t-T_1))^2 = (\alpha_{T_2}\rho(t-T_2))^2 + 2\alpha_{T_1}\alpha_{T_2}\rho(t-T_1)\rho$$
$$(t-T_2)\cos(\phi(t-T_1) - \phi(t-T_2) + \phi_c) \tag{6}$$

where $I_1$ and $I_2$ are the intensities detected from detectors 22a and 22b, respectively. Assume that the laser amplitude, $\rho$, remains constant, that the losses through the paths are equal and ideal, and that the phase shift through the 3×3 coupler is also ideal. However, a detailed description of how to account for non-ideal values is described in "Heterodyne Optical Spectrum Analyzer," by Froggatt et al., U.S. application Ser. No. 10/520,818, the disclosure of which is incorporated here by reference. Given these assumptions, the equations describing the intensities reduce to:

$$I_1(t) = \frac{\rho^2}{3} + \frac{\rho^2}{3}\cos(\theta(t)) = \frac{\rho^2}{3}(1 + \cos(\theta(t))) \tag{7}$$

and $$I_2(t) = \frac{\rho^2}{3} + \frac{\rho^2}{3}\cos(\theta(t) + \varphi_c) = \frac{\rho^2}{3}(1 + \cos(\theta(t) + \varphi_c)) \tag{8}$$

where $$\theta(t) = \phi(t - T_1) - \phi(t - T_2). \tag{9}$$

Figure 6:
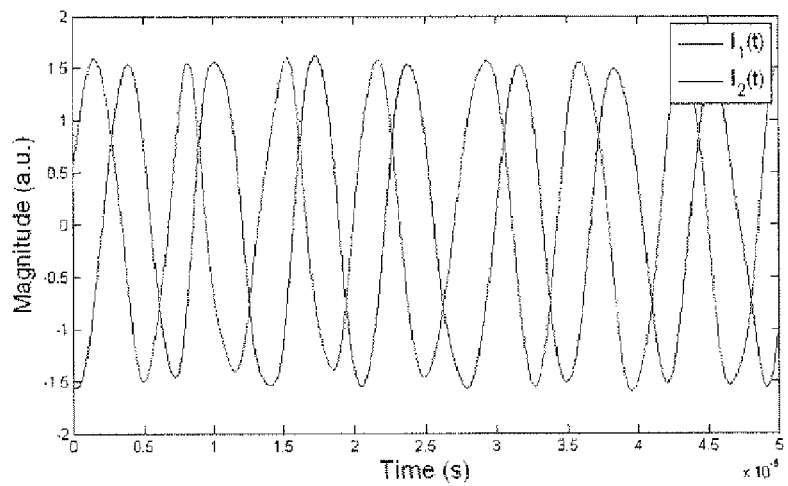
FIG. 6 is a graph illustrating example laser monitor intensity signals.
Figure 7:
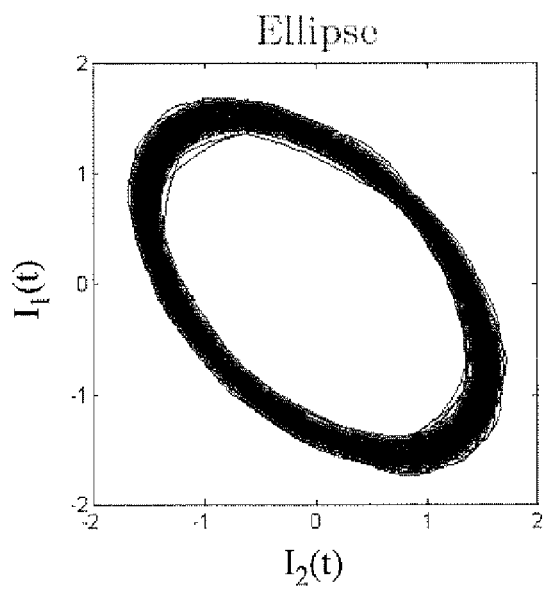
FIG. 7 is a graph of an ellipse formed by the example laser monitor intensity signals shown in FIG. 6.

If $I_1$ and $I_2$ are plotted on the same graph, two out of phase sinusoidal functions are produced as shown in FIG. 6, If these two signals are plotted against one another, $I_1$ versus $I_2$, they trace out an ellipse with increasing $\theta(t)$ mapping to clockwise rotation and decreasing $\theta(t)$ mapping to counterclockwise rotation. Swapping $I_1$ and $I_2$ or changing the sign of $\phi_c$ changes the rotation direction for a particular change in $\theta(t)$. In any given system, the direction remains constant and is easily determined. FIG. 7 shows an example elliptical plot of $I_1$ versus $I_2$ as the laser 14 is tuned through a range of frequencies.

The objective of this analysis is to recover the underlying phase $\theta(t)$. To do so, it is helpful to transform the rotating complex vector formed by $I_1$ and $I_2$ from one that traces out an ellipse to one that traces out a circle about the origin, where the vector angle to any point on the circle is $\theta(t)$. This can be done approximately for the 3×3 coupler 28 by assuming $\phi_c = 2\pi/3$ is the phase offset between output ports 1 and 2 (to which detectors 22a and 22b are coupled) of an ideal 3×3 coupler. In order to produce a linear mapping from the ellipse to a circle centered about the origin, the signals must be transformed into sine and cosine terms of the same magnitude. This is performed by subtracting an offset from each signal to center it around zero. It is also convenient to normalize the phase vector magnitude to one in order to form a unit circle, From here, the following identity is used:

$$\cos(x+y) = \cos(x)\cos(y) - \sin(x)\sin(y). \tag{10}$$

which can be rearranged to:

$$\sin(x) = \frac{\cos(x)\cos(y) - \cos(x+y)}{\sin(y)} \tag{11}$$

to yield $$\sin\theta(t) = \frac{\cos\theta(t)\cos\varphi_c - \cos(\theta(t) + \varphi_c)}{\sin\varphi_c} = \frac{I_1\cos\varphi_c - I_2}{\sin\varphi_c} \tag{12}$$

Figure 8:
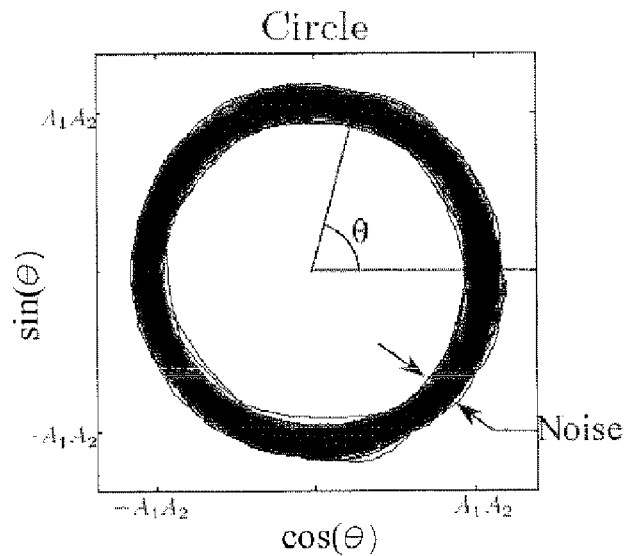
FIG. 8 is a graph of a circle formed using a processed version of the laser monitor intensity signals shown in FIG. 6.

The objective of the linear mapping results in all of the points lying on a circle in a plot of $\sin(\theta)$ vs. $\cos(\theta)$, as shown in FIG. 8, where the circle is formed by $\cos(\theta) = I_1(t)$ ($I_1(t)$ is measured) and $\sin(\theta)$, which is dependent on both I1 and I2, and calculated using equation (12). A four-quadrant arctangent is used to calculate the phase angle $\theta(t)$ which is indicative of the instantaneous frequency of the laser. The frequency is the derivative of the phase with respect to time, and so this signal is indicative of the derivative of the laser frequency.

Figure 16:
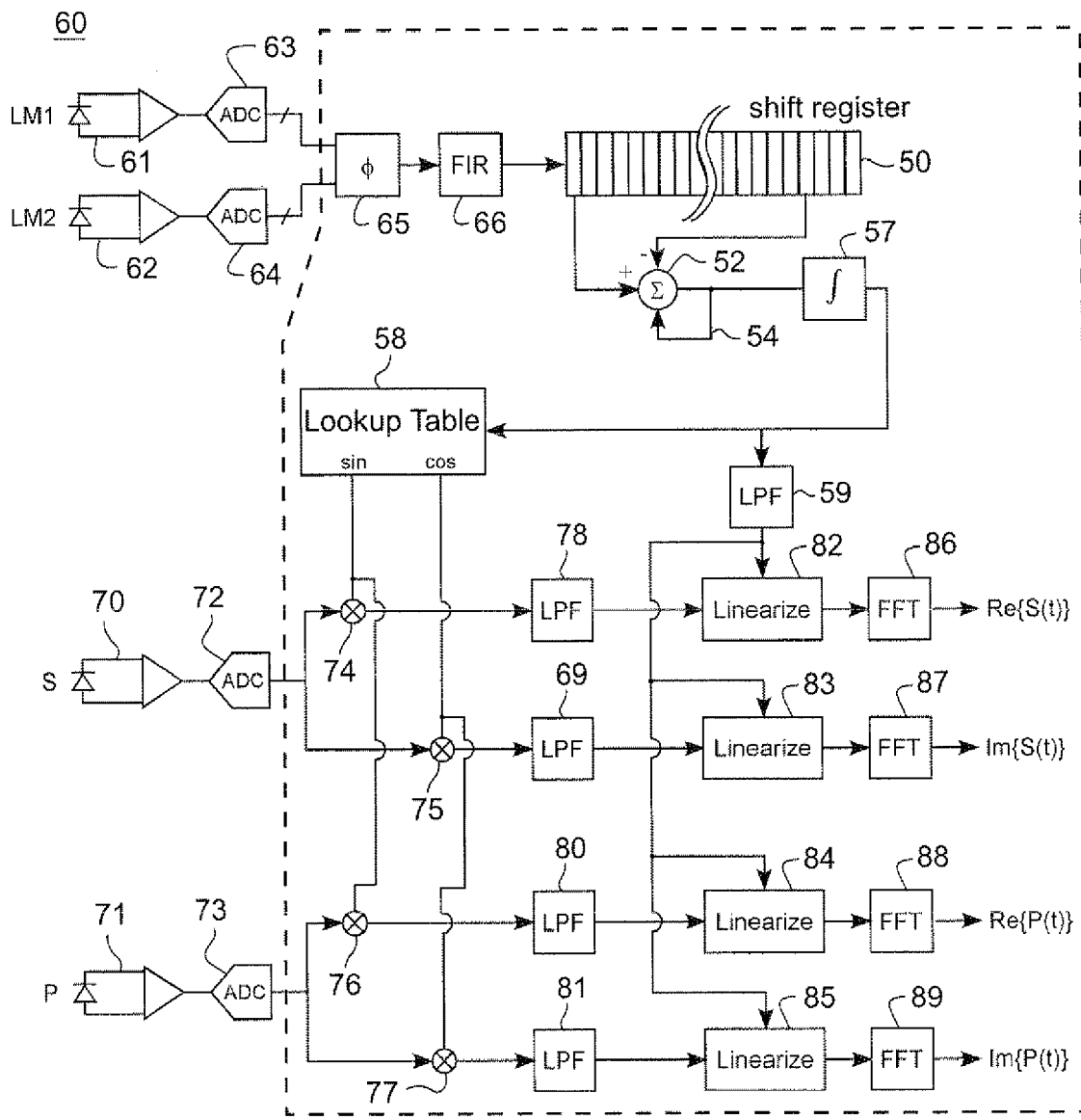
FIG. 16 is a diagram illustrating non-limiting example data processing stages.

The mathematical analysis described above can be performed using any suitable data processor. As one advantageous but non-limiting example, the processing may be performed in real-time relative to the incoming interferometric data using a field programmable gate array (FPGA) performing simple multiplications, additions, and an arctangent algorithm. Such an example implementation is illustrated in FIG. 16 with the FPGA functions being outlined by the dashed line. This implementation means that the predicted laser phase need not be stored. Because the laser phase will roll over $2\pi$ frequently or accumulate rapidly if unwrapped, the change in phase angle or the derivative of the laser frequency may be stored. The derivative of the laser frequency should vary around a value that represents the average tuning rate of the laser. Although not necessary, the operations described below can be performed on this second derivative of the laser phase (for the reasons described earlier) without losing information, and after data processing, the calculated second derivative of the phase can then be twice integrated to retrieve the phase.

Another Example Laser Phase Monitor

Figure 9:
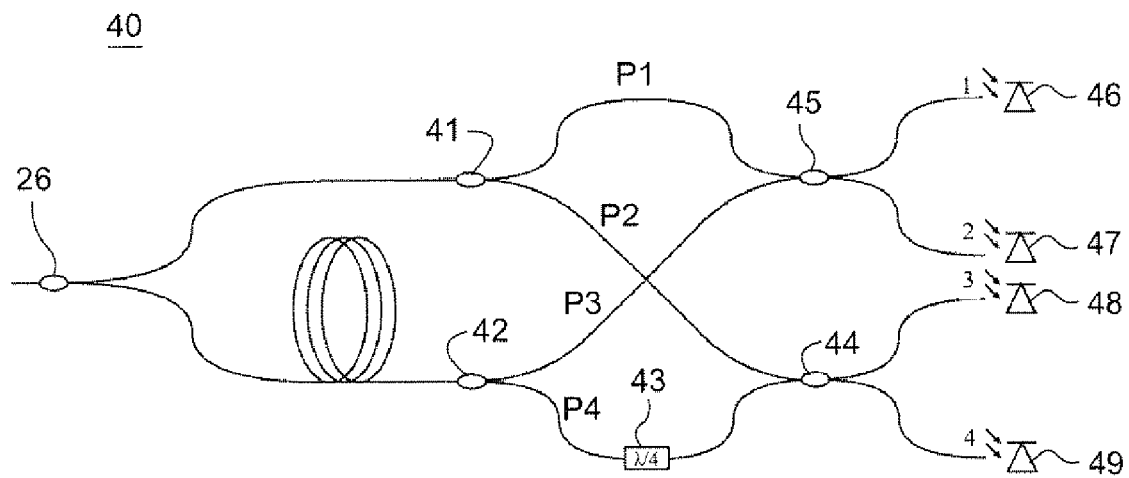
FIG. 9 is an example of an integrated optical quadrature laser phase monitor network.

Another example and non-limiting interferometer approach for laser monitor is an integrated waveguide using an optical network like the one shown in FIG. 9. This configuration is useful if one wishes to build the interferometer on an integrated optical chip, where the manufacture of 3×3 couplers is not common place. The splitter 26 splits the light between the shorter reference path and the longer delay path to respective splitters 41 and 42. Splitter 41 splits light between a first path and a second path, and splitter 42 splits light between a third path and a fourth path where the phase of the light is shifted by a quarter-wave as indicated at 43. Paths P1, P2, and P3 are equal in length, and path P4 is a quarter-wave longer or shorter to produce the appropriate phase shift. Only two photodiodes are required to conduct the complex measurement, but the use of the additional diodes allows the removal of the DC term from the signals by taking the difference between the coupler outputs as the signals.

In the example embodiment of FIG. 9, the intensity signals seen at coupler ports 1 and 2 indicated at 46 and 47 and at ports 3 and 4 indicated at 48 and 49 are:

$$P_1(t) \propto DC\ Terms + \cos(\theta(t))$$

$$P_2(t) \propto DC\ Terms - \cos(\theta(t))$$

$$P_3(t) \propto DC\ Terms + \cos(\theta(t) + \phi_{\lambda/4})$$

$$P_4(t) \propto DC\ Terms - \cos(\theta(t) + \phi_{\lambda/4}) \tag{13}$$

Given $$\phi_{\lambda/4} \equiv -\frac{\pi}{2} \tag{14}$$

the differences between intensities on ports 1 and 2 and ports 3 and 4 yield $$P_1(t) - P_2(t) \propto 2\cos(\theta(t))$$

$$P_3(t) - P_4(t) \propto 2\cos(\theta(t)) \tag{15}$$

These difference signals trace out a circle as $\theta(t)$ is varied, and therefore, can be directly processed by a four-quadrant arc tangent calculation to find $\theta(t)$.

Conversion of the Laser Monitor Phase to the Laser Phase

The calculated phase $\theta(t)$ is not the phase of the laser light $\phi(t)$, but rather the difference between the phase of the laser light at two different times. The actual laser phase $\phi(t)$ may be calculated from the above calculated phase $\theta(t)$ using the linear-systems response, or transfer function, of the laser interferometer 22 and then inverting that transfer function to obtain a transfer function that will transform this measurement of the phase difference $\theta(t)$ into a measurement of the phase $\phi(t)$. Beginning with the phase difference calculated above:

$$\theta(t) = \phi(t - T_1) - \phi(t - T_2) \tag{16}$$

Taking the Fourier transform of each side of the equation:

$$\Theta(\omega) = \Phi(\omega)e^{i\omega T_1} - \Phi(\omega)e^{i\omega T_2}. \tag{17}$$

Factoring then gives $$\Theta(\omega) = \Phi(\omega)(e^{i\omega T_1} - e^{i\omega T_2}), \tag{18}$$

yielding $$\Theta(\omega) = H(\omega)\Phi(\omega), \tag{19}$$

where the transfer function, $H(\omega)$, is the transfer function of the laser monitor interferometer 22 when it is used to find the interference phase $\phi(t)$, as described above. The transfer function is then, $$H(\omega) = e^{i\omega T_1} - e^{i\omega_2}, \tag{20}$$

and is the same for both of the laser monitor interferometer examples described above.

Figure 10:
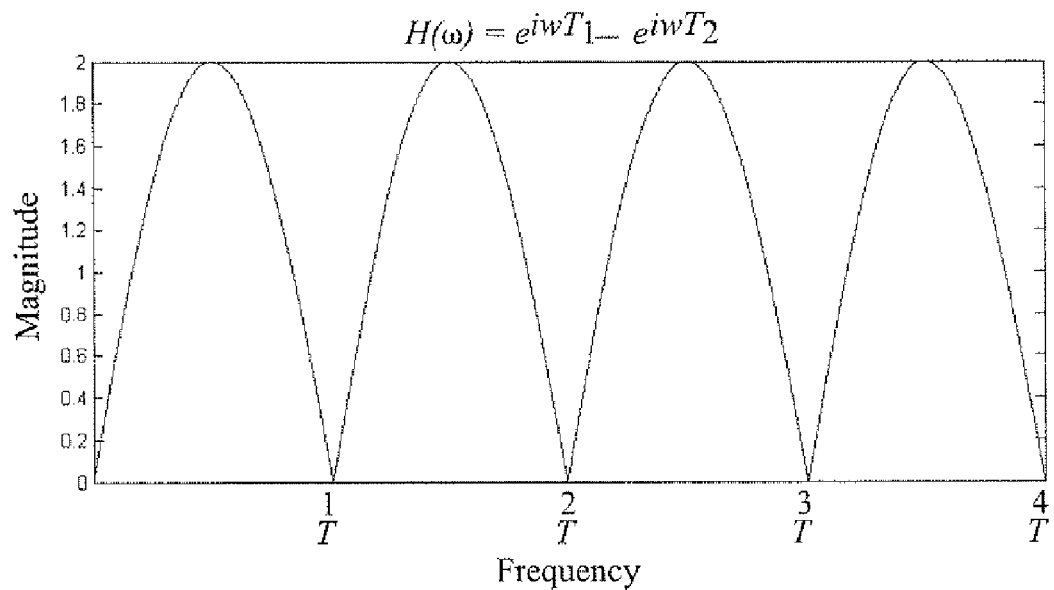
FIG. 10 is a graph illustrating an example transfer function.

Looking at the transfer function of the laser interferometer shown in FIG. 10, zeros are seen at the frequencies associated with the delay difference 1/T of the interferometer and multiples of this delay difference 2/T, 3/T, etc. In practice, this means that if a laser has a particular linewidth, then the measuring interferometer's delay difference $$T \equiv T_1 - T_2 \tag{21}$$

must be less than the coherence time of the laser, since at the frequencies associated with these zeroes, the signal contains no information about the incoming laser phase.

In order to transform the measured signal, $$\theta(t) = \phi(t - T_1) - \phi(t - T_2), \tag{22}$$

to the actual laser phase $\phi(t)$, the inverse transfer function, $H^{-1}(\omega)$, is used.

However, this inverse transfer function has singularities at zero and at n/T for all integer values of n. The singularity at zero can be avoided by computing the transfer function for the derivative of the laser phase, $$\frac{d\phi}{dt},$$

instead of the laser phase directly. The inverse transfer function is then given by:

$$H_d^{-1}(\omega) \equiv \frac{-i\omega}{e^{i\omega T_1} - e^{i\omega T_2}}, \tag{23}$$

and the singularity at zero has been eliminated. The laser phase can be recovered to within a constant value by integrating the derivative of the laser phase. For this example application, the absolute phase of the laser is not of concern and so the uncertainty of its value is not an issue. Further, the laser phase derivative may be used directly in subsequent calculations, and because it is a smaller number, fewer bits of precision are used as compared to using the laser phase, thereby reducing processing load. Indeed, as mentioned above, in an advantageous but non-limiting approach, the second derivative of the laser phase is used in the data processing steps.

Figure 11:
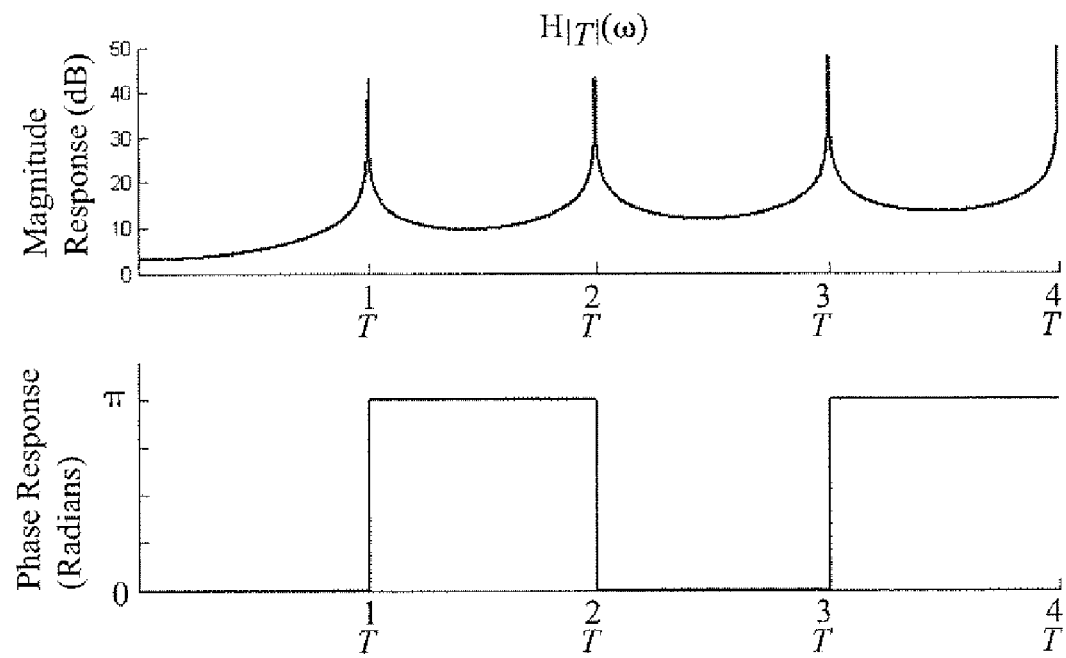
FIG. 11 graphs the magnitude and phase of the transfer function in FIG. 10.
Figure 12:
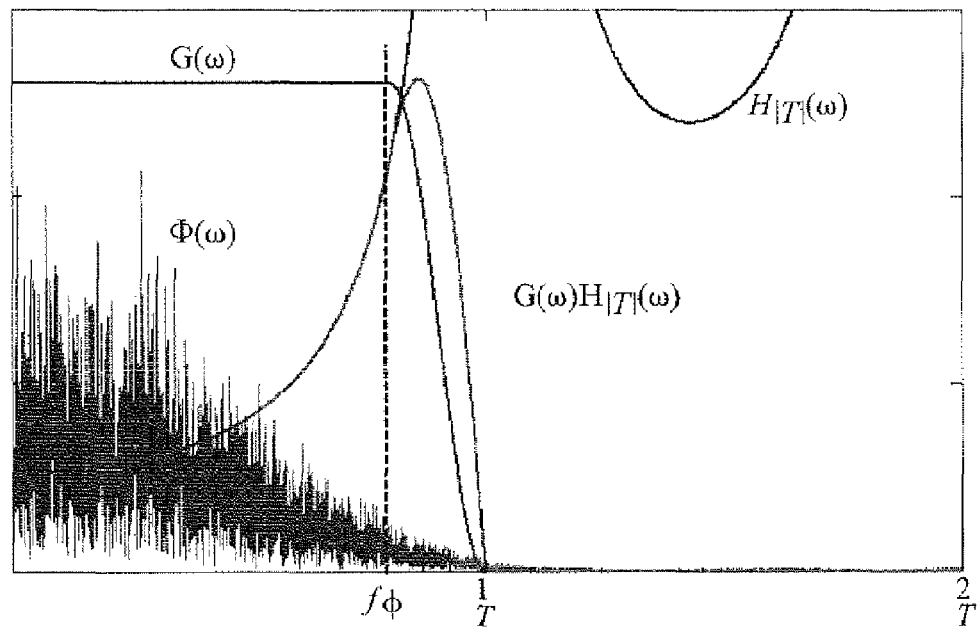
FIG. 12 graphs the transfer function, a sample window, a windowed transfer function, and some sample phase data.

The magnitude and phase of this new transfer function is shown in FIG. 11. The singularity at zero has been eliminated, but the singularities at n/T can only be handled if the spectrum of the laser phase, $\Phi(\omega)$, has negligible frequency content beyond, 1/T. If this is the case, then we can multiply $H(\omega)$ by a widowing function, $G(\omega)$, as illustrated in FIG. 12 so that the amplitude of the spectrum of the laser phase, $\Phi(\omega)$, goes to zero at 1/T and all frequencies beyond.

The phase calculation can be implemented either by transforming the interferometer phase, $\theta(t)$, into the frequency domain and multiplying by the windowed inverse transfer function, $G(\omega)H(\omega)$, and transforming the result back to the time domain, or by convolution of $\theta(t)$ with the impulse response of the transfer function, g(t). The convolution approach, implemented digitally, allows the data to be processed as it arrives, e.g., using a programmable logic device such as an FPGA (Field Programmable Gate Array). In this case, a finite-impulse response (FIR) filter can be designed that mimics the effect of the ideal transfer function and used to filter the incoming data. The FIR filter must have a gain determined by the ratio of the LM interferometer delay and the clock delay, and also by the chosen representation for phase.

After the processing described above, a signal that is representative of the derivative of the laser phase is provided. If the laser monitor phase derivative is stored and processed instead of the laser monitor phase, the above calculations result in the second derivative of the laser phase. Again, all of the processing can be performed on this second derivative without losing information. The data is twice integrated at suitable points in the signal processing.

Computing the Delay-Specific Phase

From the optical phase, the object is to obtain a phase signal corresponding to interference between the local reference path P1 of the laser monitor 18 and a second path P2 of some arbitrary (and possibly very long) length. The calculated phase of the laser light (or its derivative(s)) can be used to determine the expected response of an interferometer with any delay, even one longer than the coherence time of the laser. If the detection and data acquisition circuitry bandwidth is greater than the laser linewidth, there is no "fading" of the fringes, or loss of signal strength for any length. The response of the long interferometer 20 with a particular delay difference is unique for that reflection distance, and therefore, the expected response of the DUT interferometer 30 at a particular distance or delay can be used to determine whether there was an actual DUT response of a real system at that distance or delay.

Figure 13:
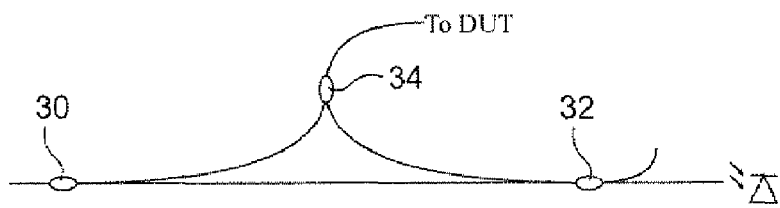
FIG. 13 is a diagram of an example non-limiting DUT interferometer.

To illustrate this concept, consider another interferometer, the delayed path of which incorporates the device under test, as shown in FIG. 13. The DUT can be modeled as an infinite number of reflectors lying at physical locations corresponding to a delay $\tau_2$. If $\tau_1$, and $\tau_2$ are the delays associated with the reference and signal paths of the DUT interferometer, the intensity seen at the detector is:

$$I_s(t) = \text{DC Terms} + \alpha_1 \rho(t-\tau_1) \int_{T_2=0}^{L} \alpha_2(\tau_2) e^{i\gamma(\tau_2)} \rho(t-\tau_2) e^{i(\phi(t-\tau_1)-\phi(t-\tau_2))} d\tau_2 \quad (24)$$

where $\alpha_2$ is the loss in the DUT path, $\gamma$ is the delay dependent phase of the DUT reflection, and $\tau_2$ is the time-of-flight delay to that particular location. The laser phase, $\Phi(i)$, can be computed as described above. The delay specific phase:

$$\theta_S(t) = \phi(t-\tau_1) - \phi(t-\tau_2) \quad (25)$$

can then be constructed from the difference of two delayed versions of the laser phase. The calculation can also be made in the frequency domain by recognizing that the transfer function for calculating $\theta_S$ is given by, $$\Theta_S(\omega) = H_S(\omega) \Phi(\omega) \quad (26)$$

where $$H_S(\omega) = (e^{i\omega\tau_1} - e^{i\omega\tau_2}) \quad (27)$$

Thus, performing the operation in the frequency domain amounts to a simple multiplication.

In order to perform the operation in the time domain, we look at the impulse response, $h_S(t) \leftrightarrow H_S(\omega)$, of the transfer function for the delay specific phase is employed:

$$h_r(t) = \delta(t-\tau_1) - \delta(t-\tau_2). \quad (28)$$

In order to implement this operation in a digital circuit, it must be converted to a sampled representation, where the signals are sampled and processed at a sample rate $f_S$. The sampled function is denoted by a tilde, and is given by, $$\tilde{h}_\tau(q) = h_\tau\left(\frac{q}{f_s}\right) = \delta\left(\frac{q}{f_s}-\tau_1\right) - \delta\left(\frac{q}{f_s}-\tau_2\right) = \delta(q-\tau_1 f_s) - \delta(q-\tau_2 f_s). \quad (29)$$

Figure 14:
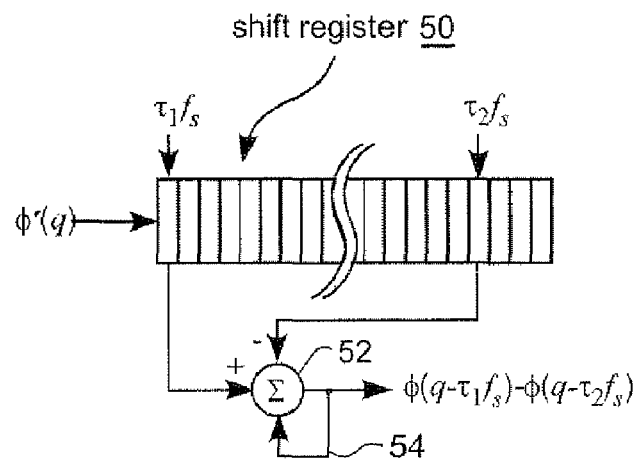
FIG. 14 is a diagram of an example non-limiting shift register for calculating a delay-specific phase.

By restricting the delays $\tau_1$, and $\tau_2$ to be integer multiples of the sample period the operation can be implemented using a shift register 50 as shown in FIG. 14 and as described in detail in "Compensating for time varying phase changes in Interferometric measurements," Froggatt and Gifford, PCT/US 05/45002, which is incorporated herein by reference. In FIG. 14, an additional accumulation at the summer 52 indicated by a feedback 54 effectively integrates the second derivative of the phase to produce to the first derivative of the phase.

Figure 15:
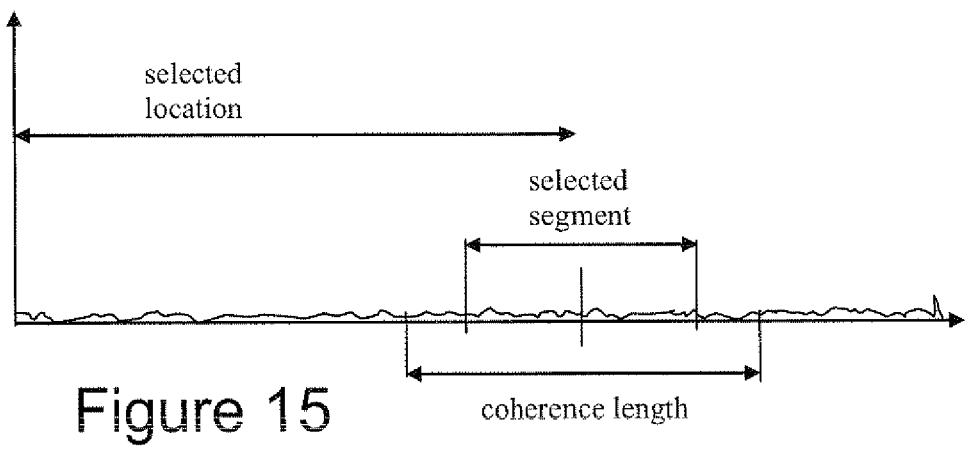
FIG. 15 is an illustration of a relationship between a selected location (or delay), a selected segment length (or range), and a laser coherence length.

The integer restriction on the delays could potentially limit the resolution of segment center locations at which the DUT can be viewed. However, the coherence length of the laser dictates a range about a given location that is viewable given a specific DUT length, as illustrated in FIG. 15 For example, a sample rate of 65 MHz leads to a minimum increment of about 15 nanoseconds or about 1.5 meters in reflection in a standard optical fiber. The linewidth of an example DFB laser is around 10 MHz, and so the coherence length in optical fiber is about 10 meters. In this example, for any chosen DUT reflection length in increments of 1.5 nm, 10 m of fiber about that location is viewable. Thus, because the coherence length of the laser is significantly larger than the minimum increment of the temporal shift register, there should not be a problem due to the integer restriction on DUT length Thus, for many practical applications and implementations, it is desirable that the bandwidth of the acquisition system exceed the line-width of the laser. In those cases where the coarse determination of the delay will not suffice, interpolation may be used to accommodate this requirement.

Generating and Mixing Signals

As described above, through the use of either a frequency domain multiplication or a time domain difference using a shift register, a predicted phase variation at particular reflection length or delay is determined. Next, this predicted phase variation signal is used to extract the information about this distant reflection from the data acquired at the DUT detectors. This process involves generating sine and cosine (I and Q) signals from the delay-specific phase. These signals are then mixed with the DUT interferometric intensity data to extract and process a desired data set, resulting in real and imaginary parts for both the s and p data sets.

Borrowing from communications theory, a local oscillator and mixing to baseband can be applied to specific locations in the fiber. In communications, the LO (Local Oscillator) signal is generally a sine wave of a fixed frequency, but in the case of interferometry, the real and imaginary parts of the interference signal expected from a particular delay can be used. The received signal (real valued by definition) is multiplied by the calculated real and imaginary expected signal. The resulting complex number is then low-pass filtered to generate a lower bandwidth signal representative of the interference from the particular segment of fiber selected by the expected interference signal. Varying the width of the filter can vary the length of the segment that this data represents.

The non-limiting example above uses the phase derivative, and the actual phase is recovered by integrating this signal with respect to time, which can be digitally implemented as an accumulator. The construction of the accumulator and subsequent conversion of phase to I and Q signals can be dramatically simplified by mapping $2\pi$ radians to a power of two integer. This is a scheme commonly implemented in Numerically Controlled Oscillators (NCO) (also know as Direct Digital Synthesizers) that available on the market. Using this approach, the accumulator can be allowed to roll over every cycle. If millions of cycles (a typical scenario) are processed, the savings in resources are significant.

In order to calculate the sine and cosine (I and Q) signals using a phase mapped to a power of two, look up tables (LUT) are generated for each signal. Each look up table is set up to generate a sine and a cosine output based on the phase mapping. These are then multiplied by each of the DUT interferometers signals incident on the s and p laser diode detectors 22c and 22d. A digital low-pass filter with a cutoff frequency smaller than the linewidth of the laser is then used to limit the frequency content of the result. This low-pass filtered signal represents the reflection from the DUT location around a center determined by the delay chosen (i.e. tap position) for the delay-specific phase calculation. The width of the low-pass filter determines the range or segment around the specific delay that is retained. The data may be decimated following the low-pass filtering since the filter frequency is generally very small compared to the sampling rate of the system. The filtered data is therefore highly oversampled. For example, for a laser with a 10 MHz line width, the maximum segment length will be about 10 meters long, but the incoming data stream will have information describing several kilometers of data. In this case, the filtered data may be oversampled by a factor of several hundred, if desired.

Linearizing the Data

The mixed and filtered delay-specific s and p interferometric data for the DUT are linearized with respect to optical frequency in order to obtain the correct, high-resolution data via a Fourier Transform. The delay-specific phase derivative is low-pass filtered and then integrated to provide a highly accurate measure of the laser frequency at that delay. This signal may then be used to linearize the data using an interpolation algorithm as described in U.S. Pat. No. 5,798,521, the contents of which are incorporated here by reference.

Achieving High Spatial Resolution

If the data from the laser monitor interferometer and the DUT monitor interferometer is recorded for just one laser wavelength, then a resolution of one over the laser linewidth is achieved. The system is probed just at those frequencies in the laser line. However, if the laser is tuned or scanned across a range of wavelengths, a much broader range of frequencies is covered, thereby achieving a higher spatial resolution. A typical laser diode can tune several GHz simply by changing the drive current. More tuning (several hundreds of GHz) can be achieved by changing the temperature of the diode by tens of degrees Celsius. The two effects can be combined by acquiring data immediately after the laser current has been turned on. The effect on the bandwidth of the signal from this sweeping of the laser frequency is marginal. For instance, for a 1 km DUT length, a sweep rate of 1 nm/s will add another 1.5 MHz bandwidth requirement to the system. But since a minimum of 10 MHz is needed to capture the laser linewidth, a 1.5% increase in bandwidth requirements is required. As one non-limiting example, a 20 MHz bandwidth covers a wide range of sweep rates, distances, and laser diodes.

FIG. 16 is a diagram illustrating non-limiting example data processing stages that incorporates many of the desirable (but required) implementation features described above. The laser monitor signals, LM1 and LM2, are converted from optical to electrical signals by detector channels 61 and 62 respectively. These electrical signals are then converted to a digital representation using Analog-to-Digital Converters (ADC's) 63 and 64, respectively. The digital signals are processed in the LM phase calculation block 65 where the LM phase is converted to a signal representative of the second derivative of the laser phase using a Finite Impulse Response (FIR) filter 66. The second derivative of the laser phase is provided to a shift register 50 which creates undelayed and delayed versions of this laser phase. These two version of the signal are subtracted in and accumulated in a summation block 52. The feedback path 54 effects the integration. A second integration block 57 "undoes" the remaining phase derivative. Alternatively, two integration blocks could be used and with the feedback path removed. Each of these operations (the FIR, the delay path and difference, and each two integrations) are linear, and thus, can be implemented in any order. It may be advantageous to change the order, such as by moving the FIR filter to after the difference calculation in order to reduce the resources needed to implement the design. The calculated delay-specific phase is then used to address a look-up table 58 that generates the sine and cosine (I and Q) signals that are used to select the signals from the locations of interest.

The signals from the two detected polarization states, S and P, are converted from optical to electrical signals by detectors 70 and 71, respectively. These electrical signals are converted to a digital representation by ADC's 72 and 73, respectively. The S channel signal is mixed with (multiplied by) the sine signal in multiplier 74 and the cosine signal in multiplier 75. The two output signals from the multipliers 74 and 75 are lowpass filtered in digital filters 78 and 69, respectively. The much lower frequency content signals leaving filters 78 and 69 are linearized using a version of the phase signal that was filtered by the digital filter 59. Because all of these signals have limited frequency content, the lowpass filters generally lower the effective sampling rate of the data to reduce the computational load of the linearizing blocks 82 and 83, respectively. This data may then be Fourier transformed in blocks 86 and 87 to produce the desired time domain signals. Because the data coming from the linearizing blocks 82 and 83 represents the real and imaginary components of a signal, they can be processed in a single complex FFT block instead of the real valued input FFT's shown.

The P channel signal is mixed with (multiplied by) the sine signal in multiplier 76, and the cosine signal in multiplier 77. These two signals from multipliers 76 and 77 are then lowpass filtered in digital filters 80 and 81, respectively. The much lower frequency content signals leaving filters 80 and 81 are then linearized using a version of the phase signal that was filtered by the digital filter 59. Because all of these signals have limited frequency content, the lowpass filters generally lower the effective sample rate or the data to reduce the computational load of the linearizing blocks 84 and 85, respectively. This data can then be Fourier transformed in blocks 88 and 89 to produce the desired time domain signals. Because the data coming from the linearizing blocks 84 and 85 represents the real and imaginary components of a signal, they can be processed in a single complex FFT block instead of the real valued input FFT's shown.

The technology described here allows relatively simple and inexpensive electronics and optics to be used to compensate for random fluctuations in laser phase. Although the primary example application described here is OFDR, computationally correcting for poor (i.e., large) laser linewidth using electronics and simple optics are expected to find much broader applications than those immediately anticipated. The technology frees interferometric systems to use lasers having a much broader range of characteristics than previously possible. Many interferometric applications of lasers, OFDR among them, find limited acceptance in the market place because of the high cost and fragility of narrow linewidth lasers. This technology addresses and obviates this problem.

Although various example embodiments have been shown and described in detail, the claims are not limited to any particular embodiment or example. None of the above description should be read as implying that any particular element, step, range, or function is essential such that it must be included in the claims scope. Reference to an element in the singular is not intended to mean "one and only one" unless explicitly so stated, but rather "one or more." The scope of patented subject matter is defined only by the claims. The extent of legal protection is defined by the words recited in the allowed claims and their equivalents. All structural and functional equivalents to the elements of the above-described example embodiment that are known to those of ordinary skill in the art are expressly incorporated herein by reference and are intended to be encompassed by the present claims. Moreover, it Is not necessary for a device or method to address each and every problem sought to be solved by the present invention, for it to be encompassed by the present claims. No claim is intended to invoke paragraph 6 of 35 USC § 112 unless the words "means for" or "step for" are used. Furthermore, no feature, component, or step in the present disclosure is intended to be dedicated to the public regardless of whether the feature, component, or step is explicitly recited in the claims.

The invention claimed is:

1. A method for interferometrically measuring an optical device under test (DUT), comprising:

scanning the optical device under test by varying a wavelength of light generated by a laser, the laser having a corresponding coherence length, and determining an interferometric response of the optical device under test to the laser scanning, wherein the optical device under test has an associated optical length greater than the coherence length of the laser.

2. The method in claim 1, wherein the coherence length is a distance that the laser light can travel and still have a predictable phase.

3. The method in claim 1, wherein the interferometric response is in the time domain.

4. The method in claim 1, wherein the interferometric response is in the frequency domain.

5. The method in claim 1, further comprising:

predicting an instantaneous or random phase of the laser at an optical length associated with the optical device under test, and using the predicted laser phase in determining the interferometric response of the optical device under test.

6. The method in claim 5, further comprising:

measuring an interferometric intensity of the optical device under test at an optical length associated with the optical device under test, and compensating for an instantaneous random phase variation of the laser at the optical length associated with the optical device under test from the measured interferometric intensity.

7. The method in claim 1, further comprising:

measuring an interferometric intensity of the optical device under test;

mixing the predicted phase of the laser with the measured interferometric intensity of the optical device under test; and using the mixed data in determining the interferometric response of the optical device under test.

8. The method in claim 1, further comprising:

providing the determined interferometric response of the optical device under test with a resolution on the order of one centimeter or less at an optical length associated with the optical device under test over a range about that optical length.

9. The method in claim 8, wherein the laser is a DFB laser or a single mode Fabry-Perot laser.

10. The method in claim 8, wherein the optical length is on the order of one hundred meters or more.

11. The method in claim 10, further comprising:

varying the optical length or the range of the optical device under test and repeating the scanning and determining steps.

12. The method in claim 1, further comprising:

detecting the interferometric intensity of the optical device under test to the laser scanning, converting the interferometric intensity into digital format using data acquisition circuitry, wherein a linewidth of the laser is less than a bandwidth of the data acquisition circuitry, the linewidth being approximately inversely proportional to the coherence length of the laser.

13. The method in claim 1, further comprising:

(a) acquiring interferometric intensity data from the laser and from the optical device under test;

(b) converting the laser interferometric intensity data to laser phase data;

(c) processing the laser phase data to generate location laser phase data at a location associated with the optical device under test;

(d) mixing the location laser phase data with the interferometric intensity data from the optical device under test; and (e) transforming the mixed data to generate the interferometric response of the optical device under test to the laser scanning.

14. The method in claim 13, wherein between steps (a) and (b) the method further comprises:
converting the laser phase data to second derivative laser phase data;
processing the second derivative laser phase data to generate location second derivative laser phase data at a location associated with the optical device under test; and
integrating the generated location second derivative laser phase data to provide location laser phase data.

15. The method in claim 13, wherein between steps (d) and (e) the method further comprises:
low pass filtering the correlated data, and
linearizing the low pass filtered data,
wherein the transforming step includes transforming the linearized data to generate the interferometric response of the optical device under test to the laser scanning.

16. Apparatus for interferometrically measuring an optical device under test (DUT), comprising:
a laser for scanning the optical device under test over a range of different wavelengths of light, the laser having a corresponding coherence length, and
electronic circuitry that determines an interferometric response of the optical device under test to the laser scanning,
wherein the interferometric response of the optical device under test has an associated optical length greater than the coherence length of the laser.

17. The apparatus in claim 16, wherein the coherence length is a distance that the laser light can travel and still have a predictable phase.

18. The apparatus in claim 16, wherein the interferometric response is in the time domain.

19. The apparatus in claim 16, wherein the interferometric response is in the frequency domain.

20. The apparatus in claim 16, wherein the electronic circuitry is programmed to:
predict an instantaneous or random phase of the laser at an optical length associated with the optical device under test, and
use the predicted laser phase in determining the interferometric response of the optical device under test.

21. The apparatus in claim 20, wherein the electronic circuitry is programmed to:
measure an interferometric intensity of the optical device under test at an optical length associated with the optical device under test, and
compensate for an instantaneous random phase variation of the laser at the the optical length associated with the optical device under test from the measured interferometric intensity.

22. The apparatus in claim 16, wherein the electronic circuitry is programmed to:
measure an interferometric intensity of the optical device under test;
mix the predicted phase of the laser with the measured interferometric intensity of the optical device under test; and
use the mixed data in determining the interferometric response of the optical device under test.

23. The apparatus in claim 16, wherein the electronic circuitry is programmed to:
provide the determined interferometric response of the optical device under test with a resolution on the order of one centimeter or less at an optical length associated with the optical device under test over a range about that optical length.

24. The apparatus in claim 23, wherein the laser is a DFB laser or a single mode Fabry-Perot laser.

25. The apparatus in claim 23, wherein the optical length is on the order of one hundred meters or more.

26. The apparatus in claim 25, wherein the electronic circuitry is programmed to:
detect the interferometric intensity of the optical device under test to the laser scanning, and
convert the interferometric intensity into digital format using data acquisition circuitry,
wherein a linewidth of the laser is less than a bandwidth of the data acquisition circuitry, the linewidth being approximately inversely proportional to the coherence length of the laser.

27. The apparatus in claim 16, wherein the electronic circuitry is programmed to perform the following tasks:
(a) acquire interferometric intensity data from the laser and from the optical device under test;
(b) convert the laser interferometric intensity data to laser phase data;
(c) process the laser phase data to generate location laser phase data at a location associated with the optical device under test;
(d) mix the location laser phase data with the interferometric intensity data from the optical device under test; and
(e) transform the mixed data to generate the interferometric response of the optical device under test to the laser scanning.

28. The apparatus in claim 27, wherein between tasks (a) and (b) the electronic circuitry is programmed to:
convert the laser phase data to second derivative laser phase data;
process the second derivative laser phase data to generate location second derivative laser phase data at a location associated with the optical device under test; and
integrate the generated location second derivative laser phase data to provide location laser phase data.

29. The apparatus in claim 27, wherein between tasks (d) and (e), the electronic circuitry is programmed to:
low pass filter the mixed data, and
linearize the low pass filtered data,
wherein the transforming task includes transforming the linearized data to generate the interferometric response of the optical device under test to the laser scanning.

30. The apparatus in claim 16, wherein the apparatus employs Optical Frequency Domain Reflectometry (OFDR).

* * * * *